(12) United States Patent
Hinkle (10) Patent No.: US 9,458,041 B2
(45) Date of Patent: Oct. 4, 2016

(54) OZONE PURIFICATION SYSTEM FOR LIQUID EFFLUENT AND WASTEWATER SYSTEMS

(75) Inventor: Bruce Edward Hinkle, Newport Beach, CA (US)

(73) Assignee: ECO-SAFE SYSTEMS USA, INC., Tarzana, CA (US)

(*) Notice: Subject to any disclaimer, the term of this patent is extended or adjusted under 35 U.S.C. 154(b) by 778 days.

(21) Appl. No.: 13/417,056

(22) Filed: Mar. 9, 2012

(65) Prior Publication Data

US 2012/0261354 A1    Oct. 18, 2012

Related U.S. Application Data

(60) Provisional application No. 61/451,567, filed on Mar. 10, 2011, provisional application No. 61/451,990, filed on Mar. 11, 2011.

(51) Int. Cl.
| | | |
|---|---|---|
| *C02F 1/78* | (2006.01) | |
| *B01F 3/04* | (2006.01) | |
| *B01F 5/04* | (2006.01) | |
| *B01F 5/06* | (2006.01) | |
| *B01F 13/10* | (2006.01) | |
| *C02F 7/00* | (2006.01) | |

(52) U.S. Cl.
CPC ............. *C02F 1/78* (2013.01); *B01F 3/04503* (2013.01); *B01F 5/0415* (2013.01); *B01F 5/0428* (2013.01); *B01F 5/0619* (2013.01); *B01F 5/0647* (2013.01); *B01F 13/1027* (2013.01); *B01F 2003/04886* (2013.01); *C02F 7/00* (2013.01); *C02F 2201/78* (2013.01); *C02F 2209/04* (2013.01)

(58) Field of Classification Search
CPC  B01F 3/04503; B01F 5/0415; B01F 5/0647; B01F 13/1027; B01F 2003/04886; C02F 1/685; C02F 1/78; C02F 7/00; C02F 2201/78; C02F 2209/04
See application file for complete search history.

(56) References Cited

U.S. PATENT DOCUMENTS

| | | | | |
|---|---|---|---|---|
| 3,904,521 | A | * | 9/1975 | Stopka .......................... 210/704 |
| 4,076,617 | A | | 2/1978 | Bybel et al. |
| 4,197,200 | A | | 4/1980 | Alig |
| 5,236,673 | A | * | 8/1993 | Coakley et al. ......... 422/186.07 |
| 5,695,635 | A | * | 12/1997 | Sasaki ....................... C02F 1/78 |
| | | | | 119/261 |
| 2001/0042708 | A1 | * | 11/2001 | Barnes .......................... 210/192 |
| 2006/0027463 | A1 | * | 2/2006 | Lavelle ................... C01B 13/10 |
| | | | | 205/556 |
| 2008/0000844 | A1 | | 1/2008 | Ralph |
| 2009/0213686 | A1 | * | 8/2009 | Heikkilae et al. .......... 366/164.6 |

(Continued)

FOREIGN PATENT DOCUMENTS

| | | | | |
|---|---|---|---|---|
| JP | 2003-001265 | | 1/2003 | |
| WO | WO 2010016448 | A1 * | 2/2010 | ................ B01F 5/06 |

(Continued)

*Primary Examiner* — Lucas Stelling
(74) *Attorney, Agent, or Firm* — One LLP (57) ABSTRACT

An ozone purification system for wastewater comprising an ozone diffusion reactor installable in or in fluid communication with wastewater collection tanks of septic or other wastewater systems. The reactor includes a pump that circulates wastewater through a gas-liquid mixing device, a contact volume, and a static mixer. The contact volume comprises an elongate length of contact piping and the static mixing chamber is configured to impart turbulence into the flow of the circulated wastewater and ozone gas.

16 Claims, 8 Drawing Sheets

(56) References Cited

U.S. PATENT DOCUMENTS

2009/0289011 A1* 11/2009 Avakian .................. 210/668
2011/0128814 A1* 6/2011 Hanada .................. 366/339

FOREIGN PATENT DOCUMENTS

WO PCT/US2012/028665 10/2012
WO PCT/US2012/028665 9/2013

* cited by examiner

OZONE PURIFICATION SYSTEM FOR LIQUID EFFLUENT AND WASTEWATER SYSTEMS

CROSS-REFERENCE TO RELATED APPLICATIONS

This application claims the benefit of U.S. Provisional Application No.61/451,567, which was filed Mar. 10, 2011, and U.S. Provisional Application No. 61/451,990, which was filed Mar. 11, 2011, which applications are incorporated herein by reference.

FIELD

The embodiments described herein relate generally to ozone disinfection and, more particularly, to systems and methods that facilitate ozone purification of liquid effluent and other wastewater.

BACKGROUND INFORMATION

Effluent discharged from a septic tank or other waste holding tanks to a leaching field, waterways, open seas, or to other systems for processing, commonly contains large counts of fecal coliform bacteria and/or other types of bacteria and contaminant metals. In land-based septic systems, release of such contaminants can result in contamination of groundwater leading to disease outbreaks. States have recently passed regulations strictly limiting the amount of such contaminants to be released by septic systems. Owners of septic systems in jurisdictions found to be in non-compliance face fines of up to several thousands of dollars per day.

In other systems that produce large amounts of wastewater, such as systems for industrial processes, local authorities may limit, and in some instances substantially limit, the amount of such wastewater that can be discharged into the sewers. Thus, it is desirable to provide systems and methods that would facilitate a significant reduction in the bacteria counts and the amount of metals and other contaminants in the liquid effluent or other wastewater discharged from septic or wastewater systems.

SUMMARY

The embodiments described herein are directed to systems and methods for ozone purification of liquid effluent or other wastewater utilizing one or more ozone diffusion reactors installable in or in fluid communication with the wastewater collection or holding tank of a septic or other wastewater discharge system. The ozone diffusion reactor includes a pump interconnected to a gas injector venturi device, a contact volume connected to the gas injector venturi device, and a static mixing chamber connected to the contact volume. The pump draws effluent or other wastewater, water or other liquid into reactor and pumps it through the gas injector venturi, the contact volume, and the static mixer. The contact volume comprises an elongate length of contact piping extending about the internal periphery of the enclosure which constrains the ozone in contact with the wastewater as it circulates through the contact piping. The contact piping can be coiled or serpentine in configuration to maximize its linear length, which in turn maximizes the time the injected ozone remains entrained in the wastewater circulating through the reactor. The inner surface of the contact piping preferably has a corrugated surface along its length which increases the turbulence of flow throughout the length of the contact piping, enhancing the solution of ozone in the liquid.

The static mixing chamber is configured to impart turbulence to the flow of wastewater and ozone passing through the mixing chamber causing the ozone gas to become re-entrained in the flow of effluent or other wastewater. In one embodiment, the chamber includes first and second pluralities of perforated plates oriented in first and second directions relative to the longitudinal axis of the chamber.

The ozone diffusion reactor operates by disinfecting septic wastewater that has collected in an effluent collection tank, wastewater holding tank, or pump vault. Wastewater that is pumped through the reactor is mixed with ozone gas by the venturi injector device and immediately begins oxidizing the organics, bacteria, and minerals within the wastewater to begin disinfecting the wastewater and continues as the ozone and wastewater circulate through the contact piping. After passing through the coiled contact piping, the wastewater and ozone pass through the in-line static mixing chamber causing the ozone to be dissolved back into the wastewater. After exiting the mixing chamber, the ozone continues oxidizing the organics, bacteria and minerals as the ozone and wastewater is discharged out of the reactor and reintroduced to the collection tank where it can be re-circulated through the reactor. Repeated cycling of the wastewater through the reactor multiplies the time that the wastewater is exposed to the ozone and enables the bacteria count to be reduced to a desired level.

The ozone diffusion reactor can be used to disinfect septic wastewater from home or business septic systems or from land, water, or air vessels including, but not limited to, cars, trucks, buses, recreation vehicles (RVs), boats, aircraft, spacecraft, and the like. It can also be used to remediate wastewater from industrial processes or from hazardous material cleanup operations.

Other systems, methods, features and advantages of the example embodiments will be or will become apparent to one with skill in the art upon examination of the following figures and detailed description.

BRIEF DESCRIPTION OF THE FIGURES

The details of the example embodiments, including structure and operation, may be gleaned in part by study of the accompanying figures, in which like reference numerals refer to like parts. The components in the figures are not necessarily to scale, emphasis instead being placed upon illustrating the principles of the invention. Moreover, all illustrations are intended to convey concepts, where relative sizes, shapes and other detailed attributes may be illustrated schematically rather than literally or precisely.

It should be noted that elements of similar structures or functions are generally represented by like reference numerals for illustrative purpose throughout the figures. It should also be noted that the figures are only intended to facilitate the description of the preferred embodiments.

DETAILED DESCRIPTION

Each of the additional features and teachings disclosed below can be utilized separately or in conjunction with other features and teachings to produce systems and methods to facilitate the ozone purification of liquid effluent or other wastewater. Representative examples of the present invention, which utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
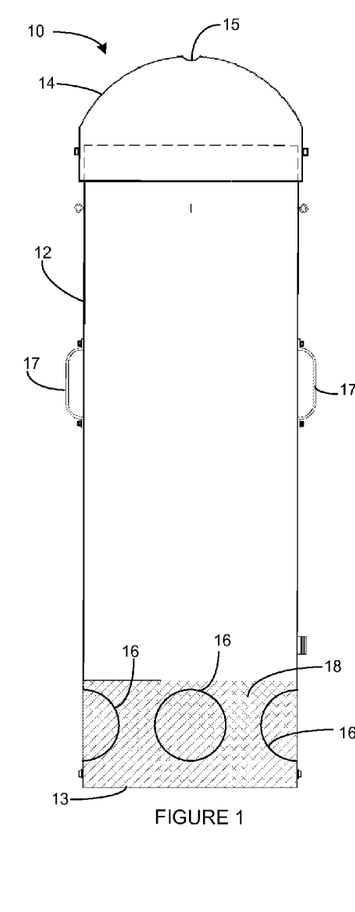
FIG. 1 is a front view of an embodiment of an ozone diffusion reactor of an ozone purification system.
Figures 2, 3:
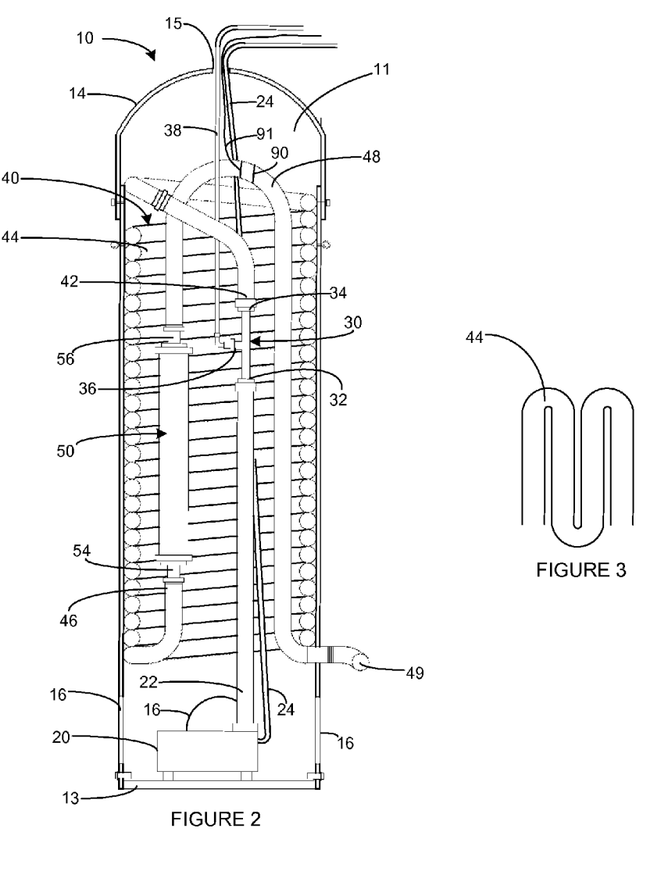
FIG. 2 is a sectional view of the ozone diffusion reactor shown in FIG. 1.
FIG. 3 is a partial detail view of a serpentine configuration of the contact piping.

The embodiments described herein are directed to systems and methods for ozone purification of septic effluent or other wastewater. In one embodiment, an ozone purification system includes an ozone diffusion reactor installable in or in fluid communication with the wastewater collection or holding tank of a septic or wastewater system. Referring to FIGS. 1 and 2, the ozone diffusion reactor 10 includes a cylindrical enclosure 12 forming a hollow chamber 11 with a base 13 attached to the bottom of the enclosure 12 and a dome shape cap 14 attacked to the top of the enclosure 12. A pair of opposing handles 17 is attached to the sides of the exterior of the enclosure 12. A plurality of holes 16 are positioned about the periphery of the enclosure 12 adjacent to the bottom of the enclosure 12. A screen mesh filter 18 is secured about the periphery of the enclosure 12 covering the holes 16 to filter debris and solids and prevent debris and solids from entering the reactor 10. The enclosure 12, cap 14, and base 13 are preferably formed from PVC. However, other non-corroding materials would also be desirable.

As depicted in FIG. 2, the reactor 10 includes a pump 20 interconnected to a gas injector venturi device 30, a contact volume 40 connected to the gas injector venturi device 30, and a static mixing chamber 50 connected to the contact volume 40. The pump 20 draws effluent or other wastewater, water or other liquid through the holes 16 in the enclosure 12 into the pump 20 and pumps it out through a connecting pipe or tubing 22 and on through the gas injector venturi 30, the contact volume 40, and the static mixer 50. A power cord 24 extends from the pump 20 through the chamber 11 and out of a hole 15 in the top of the enclosure 12 to provide power to the pump 20.

Figure 4:
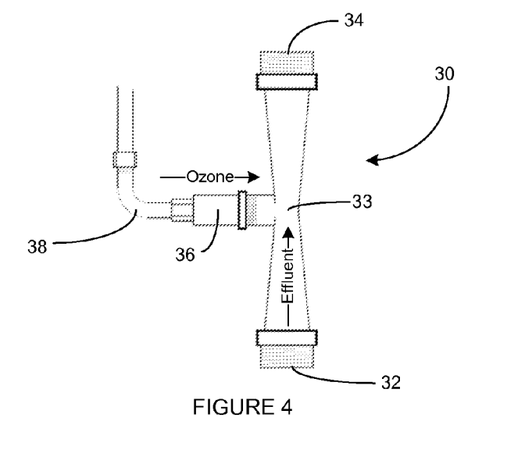
FIG. 4 is a front detail view of the gas injector venturi device shown in FIG. 1.

The gas injector venturi device 30, which is shown in greater detail in FIG. 4, is preferably a Mazzei® venturi-type, differential pressure injector. See, e.g., U.S. Pat. No. 5,863,128, which is incorporated herein by reference. As depicted, the injector 30 narrows as it transitions from an injector inlet 32 to an injection chamber 33 and then widens as the injector 30 transitions from the injection chamber 33 to an injector outlet 34. Located at the injection chamber 33 is a gas injection port 36. An ozone gas supply line 38, which extends through the chamber 11 from the hole 15 in the top of the enclosure 12, is coupled to the injection port 36. Pressurized liquid, such as effluent or other wastewater, or water, entering the inlet 32 of the injector 30 changes to a high velocity jet stream as it passes through the injection chamber 33 drawing the ozone gas in through the injection port 36 to be entrained or dissolved in the pressurized liquid.

Turning back to FIG. 2, the contact volume 40, which is coupled at its inlet 42 to the outlet 34 of the injector venturi device 30, preferably comprises an elongate length of contact piping or tubing 44 extending about the internal periphery of the enclosure 12. The inner surface of the contact piping 44 preferably has a corrugated surface along its length which increases the turbulence of flow throughout the length of the contact piping 44, enhancing the solution of ozone in the liquid. As a result, the contact piping 44 tends to constrain the ozone in contact with the liquid, e.g., the effluent or other wastewater, as it exits the venturi injector 30 entrained in the liquid and circulates with the liquid through the contact piping 44.

As depicted, the contact piping 44 is preferably tightly coiled, with the coil extending from the top of the enclosure 12 to just above the access holes 16 adjacent the bottom of the enclosure 12. As such, the coiled piping covers a majority of the interior wall of the enclosure 12 to maximize the linear length of the contact piping 44, which in turn maximizes the time the injected ozone remains entrained in or in contact with the pressurized liquid being pumped through the reactor 10.

As an alternative, the contact piping 44, as depicted in FIG. 3, can be arranged in a serpentine configuration about the periphery of the enclosure 12 wherein the contact piping 44 travels from the top of the enclosure 12 to just above the top of the access holes 16 before returning to the top of the enclosure 12. In another alternative, the contact piping 44 can be disposed on the exterior of the enclosure 12.

In one embodiment, the reactor 10 is configured with a contact volume 40 that enables sufficient contact time by using a 1 inch PVC hose wrapped around the interior of a 12 inch schedule 40 PVC pipe providing 40 feet of head pressure and an inline static mixer 50 that increases the capacity of the ozone oxidizing the bacteria in the circulated effluent or other wastewater. In this embodiment, the reactor 10 is configured to enable the regeneration of the volume of wastewater in the tank by utilizing a pump system that reclaims the tank effluent or other wastewater every 2 to 3 minutes per 40-50 gallons of wastewater. This configuration enables a process that increases the oxidizing of the effluent or other wastewater and the destruction of bacteria, pathogens or other contaminants by constant turnover of the wastewater. By repeatedly cycling the wastewater through the reactor, the time that the wastewater is exposed to the ozone is multiplied, thus enabling the bacteria count to be reduced to a desired level.

Figure 5:
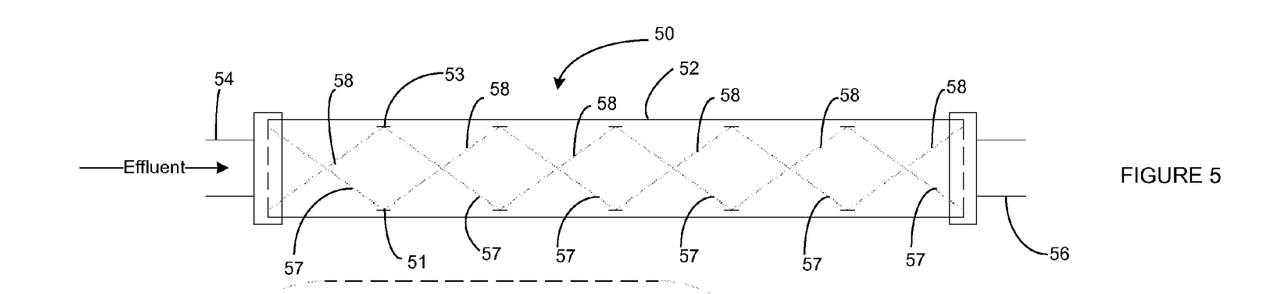
FIG. 5 is a front detail view of the static mixing chamber shown in FIG. 1.
Figure 6:
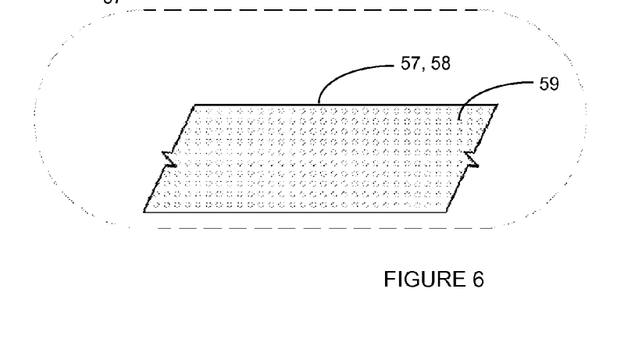
FIG. 6 is a detail view of a perforated plate from the static mixing chamber shown in FIG. 5.

Turning back to FIG. 2, the static mixing chamber 50 is coupled at its inlet 54 to the end or outlet 46 of the coil of the contact piping 44 and is configured to impart turbulence to the flow of effluent or other wastewater and ozone. In one embodiment, the static mixing chamber 50, which is shown in greater detail in FIG. 5, comprises a cylindrical enclosure 52 having a first plurality of plates 57 oriented in a first direction with their first 51 and second 53 ends preferably press-fit to the wall of the enclosure 52 and a second plurality of plates 58 oriented in a second direction, which is 180 degrees opposite the first direction, and with their first 51 and second 53 ends press-fit to the wall of the enclosure 52. As detailed in FIG. 6, the first and second plurality of plates 57 and 58 are perforated with a plurality of holes 59. As the pressurized effluent or other wastewater and entrained ozone gas travel through the coiled contact piping 44, the amount of ozone gas in solution is diminished as bubbles of ozone gas form. The static mixing chamber 50 adds additional turbulence into the flow of effluent or other wastewater and ozone gas, which in turn re-entrains much of the ozone gas in the effluent or other wastewater.

The contact volume 40 includes a contact piping discharge section 48 comprising an elongate length of pipe coupled to the outlet 56 of the static mixing chamber 50. As with the coiled contact piping 44, the linear length of the discharge section 48 is preferably maximized by extending it upwardly from the static mixing chamber 50 toward the top of the enclosure 12 before extending it downwardly toward the bottom of the enclosure 12 where it exits the enclosure adjacent the top of the access holes 16. Alternatively, the discharge contact piping 48 could be arranged in a coiled or serpentine configuration to further maximize its linear length.

Figure 7:
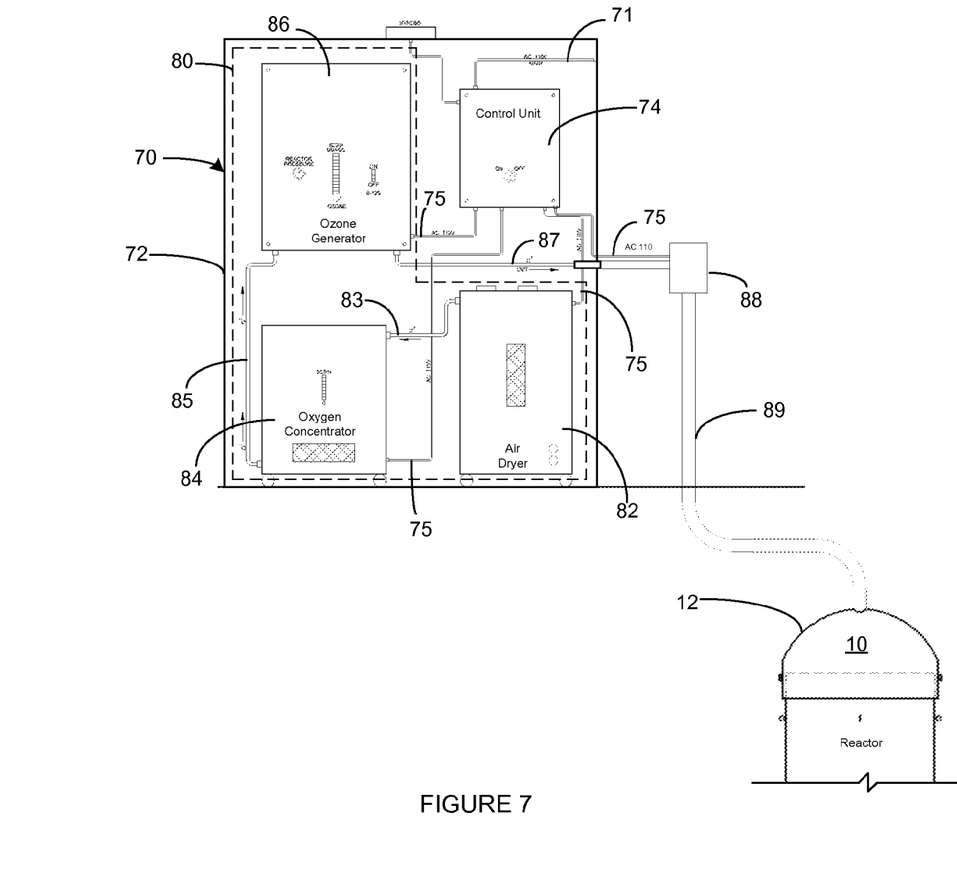
FIG. 7 is a front view schematic of the ozone generation and control system and partial front view of the ozone diffusion reactor shown in FIG. 1.

Referring to FIG. 7, an ozone generation and control system 70 is shown housed in a utility panel 72 and including a control unit 74 and an ozone generation system 80 comprising an air intake/air dryer 82, an oxygen concentrator 84, and an ozone generator 86. Electrical power (AC) 71 is received and distributed along AC power lines 75 by the control unit 74 to the air intake/air dryer 82, the oxygen concentrator 84, the ozone generator 86 and the junction box 88 for coupling to the AC power cord 24 for the pump 20. The control unit 74 preferably includes conventional timer-based control logic and switch controls to cycle the pump 20, the ozone generator 86, the oxygen concentrator 84 and the air intake/dryer 82 for predetermined time periods in predetermined intervals. The air intake/air dryer 82 draws in and provides dry air to the oxygen concentrator 84 through tubing 83. The oxygen concentrator 84 provides concentrated oxygen to the ozone generator 86 through tubing 85. The ozone generator 86, which is preferably a conventional ozone generator, provides ozone through tubing 87 to the junction box 88 for coupling to the ozone supply tubing 38 (see FIG. 2). A PVC conduit 89 is coupled to the junction box 88 and extends from the junction box 88 to the opening 15 in the enclosure 12 of the ozone diffusion reactor 10.

Figure 9:
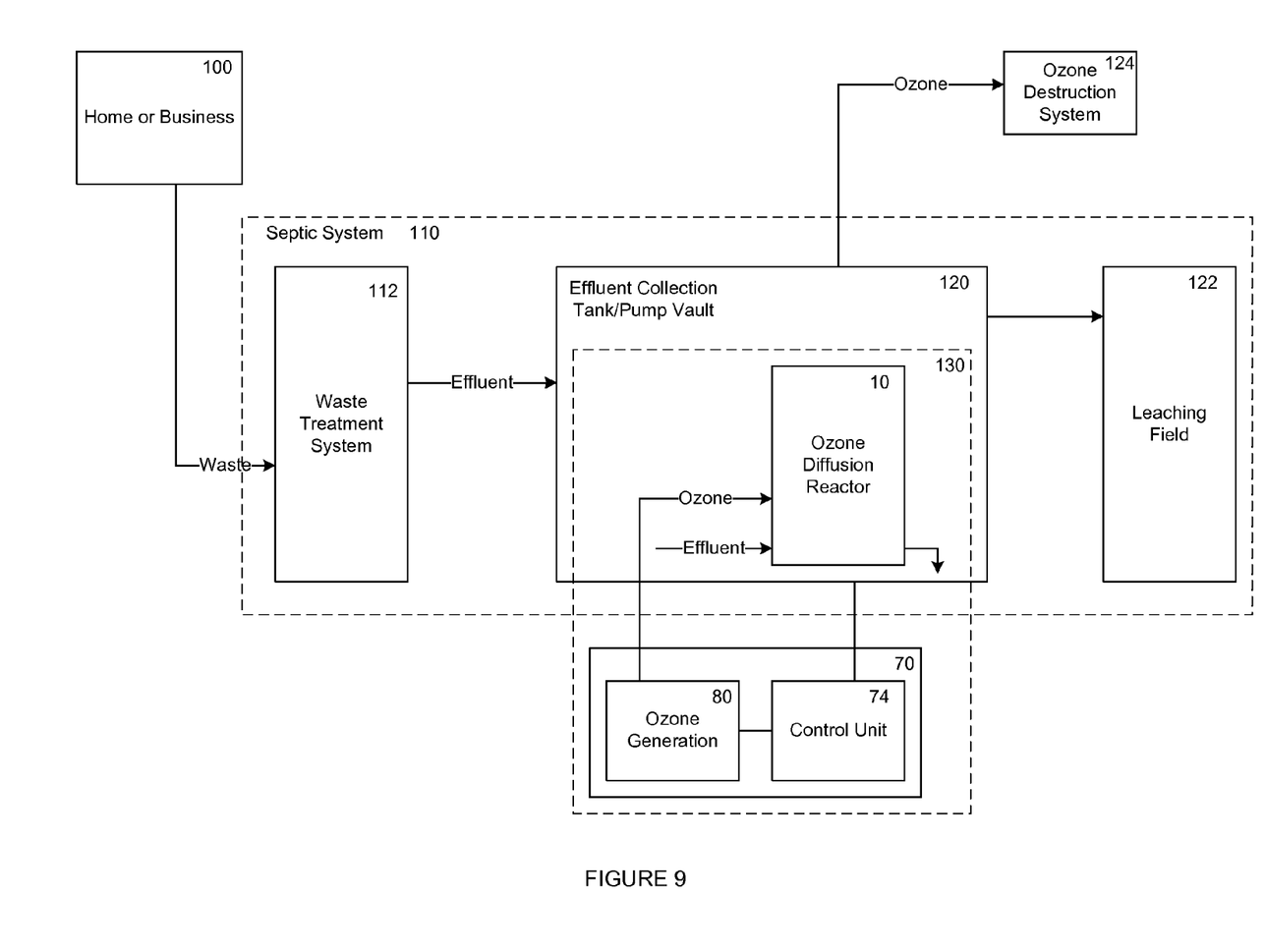
FIG. 9 is a schematic of the ozone diffusion reactor shown implemented in the septic system of a home or business as part of an ozone purification system.

The ozone diffusion reactor 10 operates by disinfecting septic effluent or other wastewater that has collected in an effluent collection tank, wastewater holding tank, or pump vault (see e.g., FIG. 9). Wastewater that is pumped through the reactor 10 is mixed with ozone gas by the venturi injector device 30. As ozone is put into solution with the wastewater, the ozone immediately begins oxidizing the organics, bacteria, and minerals with the wastewater to begin disinfecting the wastewater and continues as the ozone and wastewater pass through the contact piping 44. After passing through the coiled contact piping 44, the wastewater and ozone pass through the in-line static mixing chamber 50 causing the ozone to be dissolved back into the wastewater, which increases the efficiency of the oxidizing effect of the ozone on the organics, bacteria, and minerals in the wastewater. After exiting the mixing chamber 50, the ozone continues oxidizing the organics, bacteria and minerals as the ozone and wastewater flow through the discharge section 48 of the contact piping and the disinfected effluent or other wastewater is then discharged out of the reactor 10 and reintroduced to the collection tank where it can be re-circulated through the reactor 10.

This circulation or turnover of effluent or other wastewater through the reactor 10 provides further oxidation enhancement. The amount of turnover in gallons to reduce the bacterial load is determined by the ozone dosage output required, the original amount of bacterial load, and flow rate of the wastewater of the system. In a preferred embodiment, the volume of effluent or other wastewater in the reactor 10 will preferably range from 15 to 25% of tank volume.

Ozone dosage varies depending on the bacterial and organic load. This is regulated automatically by a sensor 90 measuring the Oxidation-Reduction Potential (ORP) value of the effluent or other wastewater in the reactor 10. The sensor 90, as depicted in FIG. 2, is positioned in the discharge contact piping 48 and interconnected to the control unit 74 via a wire link 91 or wirelessly. For a given septic system, the cutoff value for ORP sensor can be determined experimentally by laboratory analysis of the bacteria remaining in the treated effluent or other wastewater. When the ORP value attains a predetermined maximum value, the control unit 74 will turn off the reactor. When the ORP value drops below a predetermined minimum value, the control unit 74 will turn on the reactor.

Figure 8:
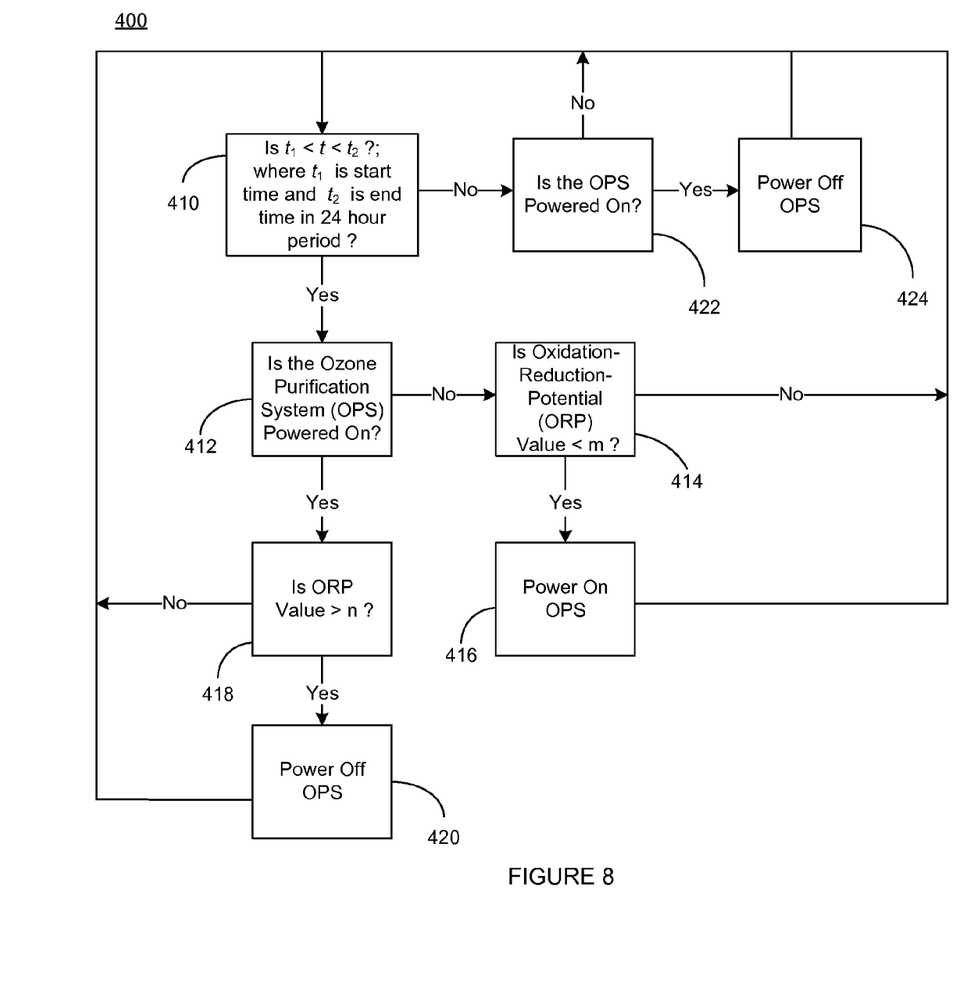
FIG. 8 is a flow chart showing the process step in the control of an ozone purification system.

Referring to FIG. 8, a control process 400 of the ozone purification system is shown. At step 410, the control unit 74 determines whether the time t of day falls within the time set to run the ozone purification system (OPS), i.e., between the set start $t_1$ and end $t_2$ times, which could encompass a full 24 hour period. Alternatively, multiple time ranges having different start and end time than $t_1$ and $t_2$ can be set. If t does fall within the time set to run the OPS, the control unit 74 checks at step 412 to see if the OPS is powered on. If t does not fall within the time set to run the OPS, the control unit 74 determines at step 414 if the oxidation reduction potential (ORP) value is less than a minimum predetermined value m related to the bacteria count in the disinfected wastewater. If the ORP value is not less than m, the process returns to step

410. If the ORP value is less than m, the control unit 74 switches on the power to the OPS at step 416 and the process then returns to step 410.

If at step 412 the control unit 74 determines the OPS is already powered on, it proceeds to step 418 to determine whether the ORP value is greater than a maximum value n related to the bacteria count in the disinfected wastewater. If the ORP value is not greater than n, the process returns to step 410 and the OPS continues to circulate effluent or other wastewater through the ozone diffusion reactor 10 as described above. If the ORP value is greater than n, the control unit 74 switches the power off to the OPS and the OPS ceases to circulate effluent or other wastewater through the ozone diffusion reactor 10 until the OPR drops below the OPR value m. The process returns to step 410.

If at step 410 the control unit determines the time of day t is outside the time set to run the ozone purification system, the control unit 74 determines at step 422 whether the OPS is powered on. If the OPS is not powered on, the process returns to step 410. If the OPS is powered on, the control unit 74 at step 424 switches off the power to the OPS and returns to step 410.

Figure 10:
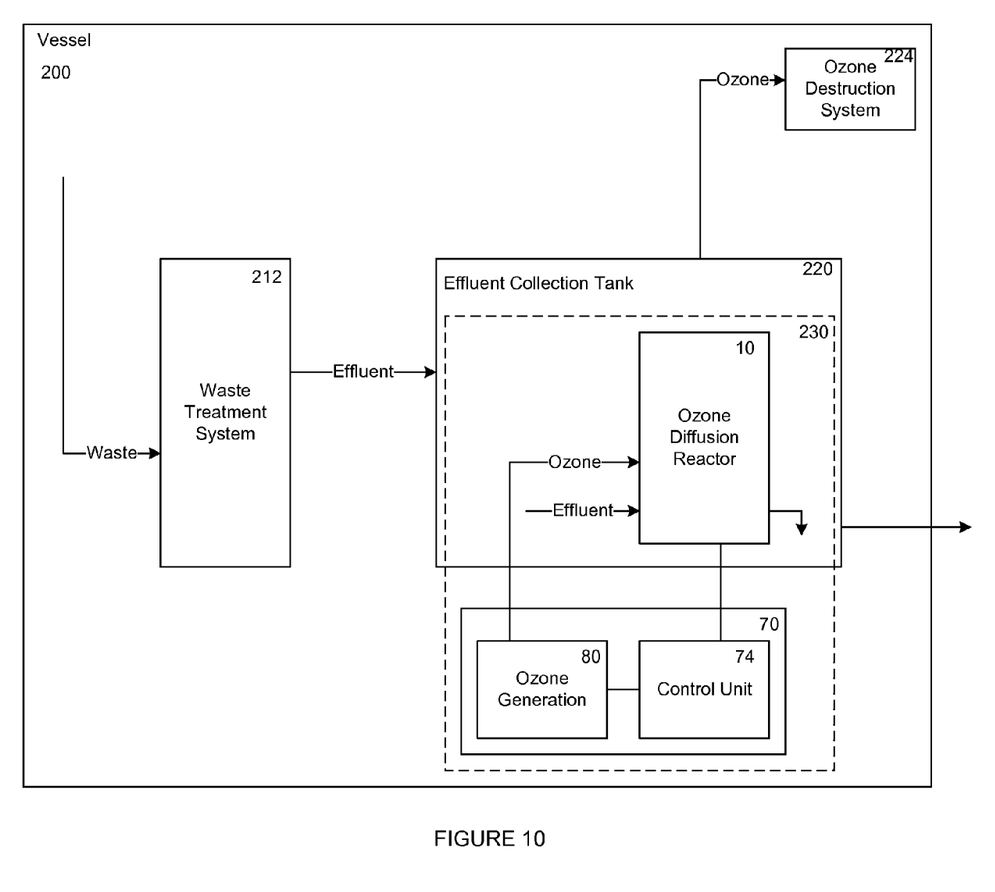
FIG. 10 is a schematic of the ozone diffusion reactor shown implemented in the effluent or other wastewater collection tank of a vessel as part of an ozone purification system.
Figure 11:
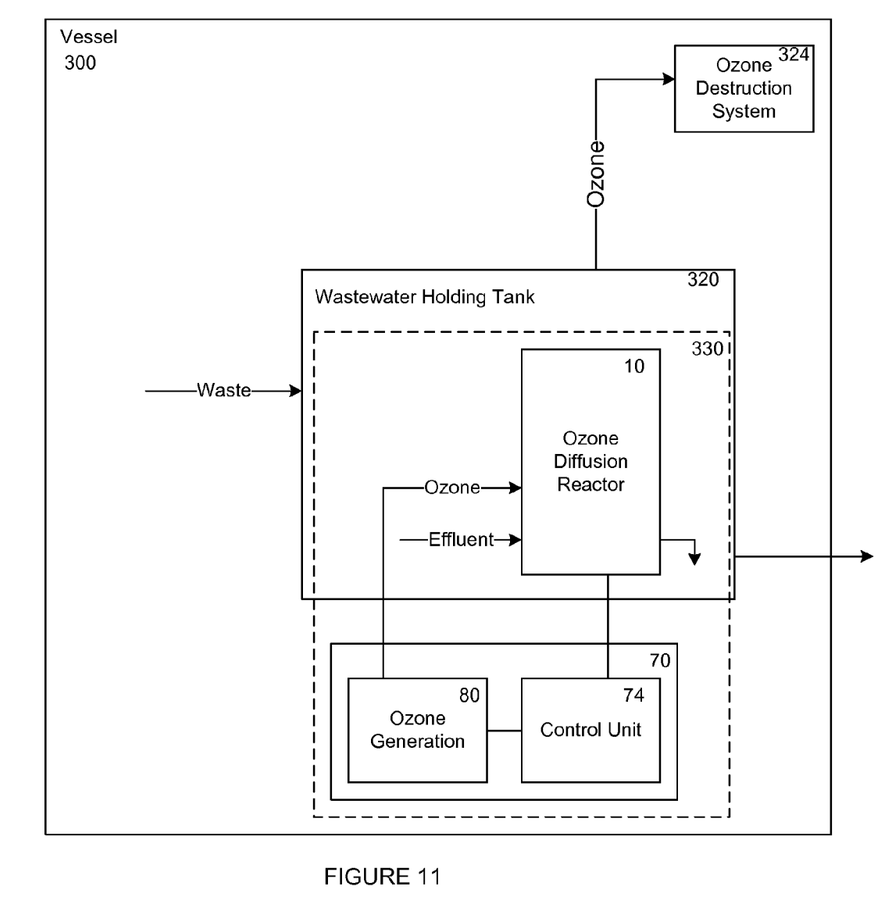
FIG. 11 is a schematic of the ozone diffusion reactor shown implemented in the holding tank of a vessel as part of an ozone purification system.

Referring to FIGS. 9 through 11, the ozone diffusion reactor 10 can be used to disinfect septic wastewater from home or business septic systems or from land, water, or air vessels including, but not limited to, cars, trucks, buses, recreation vehicles (RVs), boats, aircraft, spacecraft, and the like. It can also be used to disinfect wastewater from industrial processes or from hazardous material cleanup operations.

Turning to FIG. 9, a home or business 100 is shown with a septic system 110 comprising a waste treatment system 112 which includes a separator/clarifier tank that discharges septic wastewater to an effluent or other wastewater collection tank/pump vault 120. The effluent or other wastewater collection tank/pump vault 120 includes a float operated pump that discharges the septic effluent or other wastewater to a leach field 122 or other sub-surface drip system. As depicted, an ozone diffusion reactor 10 of an ozone purification system 130 can be installed within the existing effluent or other wastewater collection tank and pump vault 120 or installed as a kit comprising the combination of the effluent or other wastewater collection tank and pump vault 120 and the ozone diffusion reactor 10. Alternatively, the ozone diffusion reactor 10 can be installed outside of and in fluid communication with the effluent or other wastewater collection tank 120.

As further depicted, the ozone diffusion reactor is coupled to an ozone generation and control system 70 comprising an ozone generation system 80 and control unit 74 as described above. In one embodiment, an ozone gas destruction system 124 such as, for example, a carbon filter, will be coupled to the effluent or other wastewater collection tank and pump vault 120 to reduce the emission of ozone gas to the surrounding environment.

The ozone purification system 130 is operated as described above wherein wastewater is pumped from the effluent or other wastewater collection tank and pump vault 120 through the reactor 10 where it is mixed with ozone gas by the venturi injector device 30. As ozone is put into solution with the wastewater, it begins disinfecting the wastewater and continues as the ozone and wastewater solution circulates through the reactor 10 and discharges back into the effluent or other wastewater collection tank and pump vault 120 where it can be re-circulated through the reactor 10.

In an experimental septic system installation, the wastewater flow rate is estimated to have averaged approximately 300 to 500 gallons per day. The oxygen concentrator 84 operates in a range of about 8 to 10 SCFH. The ozone generator 86 operates in a range of about 6 to 8 grams per hour. The reactor pump 20 operates in a range of about 40 to 50 gpm. The incoming wastewater at the experimental installation can have a fecal coliform bacteria count of greater than 1 million cfu/100 ml upon entering the effluent or other wastewater collection tank/pump vault 120. After circulating through the diffusion reactor 10, the wastewater has been shown to be disinfected to a fecal coliform bacteria count of less than 200 cfu/100 ml when exiting the diffusion reactor 10, and down to undetectable levels of fecal coliform bacteria count as well. Thus, it is possible to process wastewater having a fecal coliform bacteria count or other bacteria count of greater than 1 million cfu/100 ml and purify or disinfect the wastewater by circulating it through the diffusion ozone reactor and reducing its fecal bacteria count to a range between less than 200 cfu/100 ml and about zero cfu/100 ml.

Referring to FIG. 10, a vessel 200 is shown having a waste treatment system 212 which includes a separator/clarifier tank that discharges septic wastewater to an effluent or other wastewater collection tank 220. The effluent or other wastewater collection tank 220 is emptied in a conventional manner. As depicted, an ozone diffusion reactor 10 of an ozone purification system 230 can be installed within the existing effluent or other wastewater collection tank 220 or installed as kit comprising the combination of the effluent or other wastewater collection tank 220 and the ozone diffusion reactor 10. Alternatively, the ozone diffusion reactor 10 can be installed outside of and in fluid communication with the effluent or other wastewater collection tank 220.

As further depicted, the ozone diffusion reactor is coupled to an ozone generation and control system 70 comprising an ozone generation system 80 and control unit 74 as described above. In a one embodiment, an ozone gas destruction system 224 such as, for example, a carbon filter will be coupled to the effluent or other wastewater collection tank 220.

The ozone purification system 230 is operated as described above wherein wastewater is pumped from the effluent or other wastewater collection tank 220 through the reactor 10 where it is mixed with ozone by the venturi injector device 30. As ozone is put into solution with the wastewater, it begins disinfecting the wastewater and continues as the ozone and wastewater solution circulates through the reactor 10 and discharges back into the effluent or other wastewater collection tank 220 where it can be re-circulated through the reactor 10.

Referring to FIG. 11, a vessel 300 is shown having a wastewater holding tank 320. The wastewater holding tank 320 is emptied in a conventional manner. As depicted, an ozone diffusion reactor 10 of an ozone purification system 330 can be installed within the existing wastewater holding tank 320 or installed as kit comprising the combination of the wastewater holding tank 320 and the ozone diffusion reactor 10. Alternatively, the ozone diffusion reactor 10 can be installed outside of and in fluid communication with the effluent or other wastewater collection tank 320.

As further depicted, the ozone diffusion reactor is coupled to an ozone generation and control system 70 comprising an ozone generation system 80 and control unit 74 as described above. In a one embodiment, an ozone gas destruction system 324 such as, for example, a carbon filter will be coupled to the wastewater holding tank 320.

The ozone purification system 330 is operated as described above wherein wastewater is pumped from the holding tank 320 through the reactor 10 where it is mixed with ozone gas by the venturi injector device 30. As ozone is put into solution with the wastewater, it begins disinfecting the wastewater and continues as the ozone and wastewater solution circulates through the reactor 10 and discharges back into the holding tank 320 where it can be re-circulated through the reactor 10.

Figure 12:
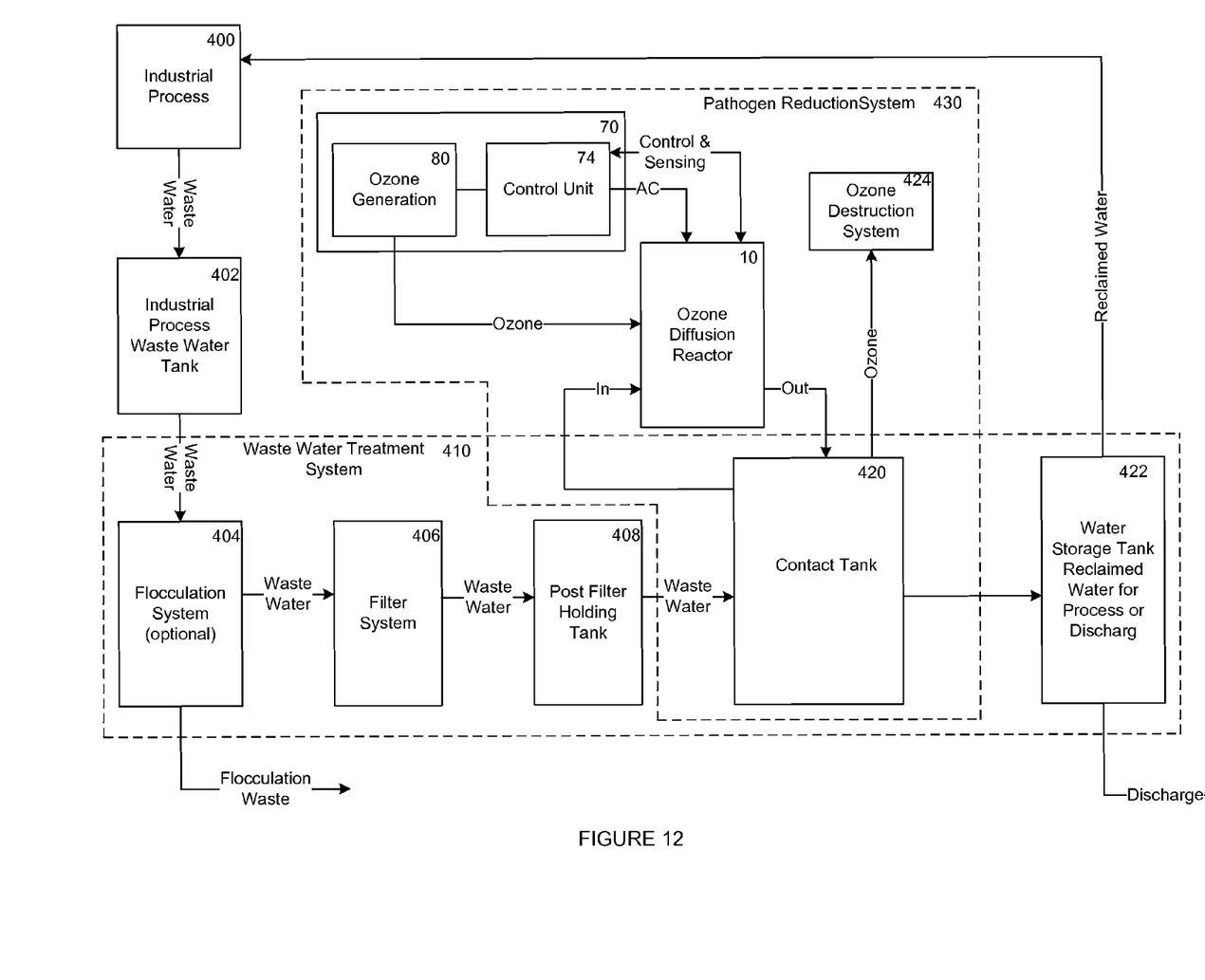
FIG. 12 is a schematic of the ozone diffusion reactor shown implemented in an industrial process wastewater treatment system as part of a pathogen reduction system. The reactor can operate outside of a wastewater tank as shown.

Turning to FIG. 12, as depicted, an industrial process 400 produces wastewater, which as shown is collected in a wastewater tank 402 and processed through a wastewater treatment system 410. The industrial process 400 may represent any variety of industrial processes that produce pathogen or bacterial laden wastewater such as, for example, industrial food process, or may be a hazardous material clean up process.

As depicted, the wastewater treatment system 410 comprises a filter system 406 and a post filter holding tank 408 that discharges wastewater to a contact tank 420 of a pathogen reduction system 430. Optionally, the wastewater treatment system 410 can include a flocculation system 404. The contact tank 420 includes a float operated pump that discharges the wastewater to a reclaimed water storage or wastewater discharge tank 422. As depicted, an ozone diffusion reactor 10 of the pathogen reduction system 430 can be installed in fluid communication with the contact tank 420 or within the contact tank 420, which may be an existing pump vault, or installed as a kit comprising the combination of the contact tank 420 and the ozone diffusion reactor 10. As further depicted, the ozone diffusion reactor 10 is coupled to an ozone generation and control system 70 comprising an ozone generation system 80 and control unit 74 as described above. In one embodiment, an ozone gas destruction system 424 such as, for example, a carbon filter, will be coupled to the contact tank 420 to reduce the emission of ozone gas to the surrounding environment.

The pathogen reduction system 130 is operated as described above wherein wastewater is pumped from the contact tank 420 through the reactor 10 where it is mixed with ozone gas by the venturi injector device 30. As ozone is put into solution with the wastewater, it begins disinfecting the wastewater and continues as the ozone and wastewater solution circulates through the reactor 10 and discharges back into the contact tank 420 where it can be re-circulated through the reactor 10.

The disinfected wastewater is pumped from the contact tank 420 to the water storage tank 422. From the water storage tank 422, the disinfected wastewater is discharged to a sewer or other wastewater disposal system or pumped as reclaimed water back to the industrial process 400.

The example embodiments provided herein, however, are merely intended as illustrative examples and not to be limiting in any way. Moreover, one skilled in the art will readily recognize that similar systems can be equally adapted with appropriate modification of parameters.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed is:

1. An ozone diffusion reactor positionable within a wastewater collection tank having a volume of wastewater contained therein, the reactor comprising an elongate enclosure having a top end and a bottom end with a wall extending there between forming a hollow chamber, wherein the top end of the enclosure is enclosed and the bottom end includes a plurality of openings in the wall positioned about a periphery of the enclosure adjacent the bottom end of the wall of the enclosure, the plurality of openings fluidly communicating with the hollow chamber to allow wastewater to enter the chamber upon submerging the enclosure into a volume of wastewater contained within a wastewater collection tank, the wall of the enclosure having an interior surface and an exterior surface, a liquid-gas mixing device positioned within the chamber and configured to inject ozone into wastewater flowing through the liquid-gas mixing device, the liquid-gas mixing device having an inlet, an outlet and an ozone injection port positioned between the inlet and outlet, a contact volume positioned within the chamber and interconnected to the outlet of the liquid-gas mixing device, wherein the contact volume comprises an elongate length of contact piping extending one or more turns about a perimeter of the chamber along the interior surface of the wall, wherein the contact volume includes a turbulence imparting interior surface to impart turbulence to a mixture of wastewater and ozone gas as the mixture of wastewater and ozone flows through the contact volume, a static mixing chamber coupled to the contact volume and positioned within the chamber, the static mixing chamber configured to impart turbulence to the mixture of wastewater and ozone gas as the mixture of wastewater and ozone flows through the static mixing chamber, and a pump positioned within the chamber and interconnected to the liquid-gas mixing device, when the enclosure is at least partially submerged in a volume of wastewater, the pump being configured to draw wastewater from the volume of wastewater within the chamber external to the liquid-gas mixing device, contact volume and static mixing chamber and entered through the plurality of openings in the wall, and pump the wastewater through liquid gas mixing device, contact volume and static mixing chamber and back into the volume of waste water.

2. The reactor of claim 1 wherein the turbulence imparting interior surface of the contact piping is corrugated along the length of the contact piping.

3. The reactor of claim 1 wherein the contact piping extends about the perimeter of the chamber along the interior surface of the wall in one of a coiled configuration and a serpentine configuration.

4. The reactor of claim 3 wherein the contact piping extends from adjacent to the top end of the enclosure to adjacent to the bottom end of the enclosure.

5. The reactor of claim 4 further comprising an ozone generation and control system operably coupled to the pump and liquid-gas mixing device.

6. The reactor of claim 1 wherein the static mixing chamber comprises a plurality of perforated plates.

7. The reactor of claim 6 wherein the plurality of perforated plates includes a first set of plates oriented in a first direction and a second set of plates oriented in a second direction relative to a longitudinal axis of the chamber.

8. The reactor of claims 1 further comprising an ozone generation and control system operably coupled to the pump and liquid-gas mixing device.

9. The reactor of claim 8 further comprising an oxidation reduction potential sensor operably coupled to a control unit of the ozone generation and control system.

10. The reactor of claim 9 wherein the control unit comprises timer based control logic.

11. The reactor of claim 8 wherein the ozone generation and control system includes an ozone generator and an oxygen concentrator.

12. The reactor of claim 11 wherein the ozone generation and control system further comprises an oxygen concentrator coupled to the ozone generator and an air intake and air dryer system coupled to the oxygen concentrator.

13. The reactor of claim 1 wherein the liquid-gas mixing device is a verturi-type, differential pressure injector.

14. The reactor of claim 1 wherein the ozone diffusion reactor further comprises a wire mesh filter extending about the periphery of the enclosure covering the plurality of access holes adjacent the bottom end of the enclosure.

15. The reactor of claim 1 wherein the liquid-gas mixing device includes a liquid flow inlet and outlet in communication with an injection chamber and a gas injection port in communication with the injection chamber.

16. In a wastewater treatment system comprising a wastewater holding tank and an ozone diffusion reactor at least partially submerged within a volume of wastewater contained in the wastewater holding tank, the ozone diffusion reactor comprising an elongate enclosure having a top end and a bottom end with a wall extending there between forming a hollow chamber, wherein the top end of the enclosure is enclosed and the bottom end includes a plurality of openings in the wall positioned about a periphery of the enclosure adjacent the bottom end of the wall of the enclosure, the plurality of openings fluidly communicating with the hollow chamber to allow wastewater to enter the chamber upon submerging the enclosure into the volume of wastewater contained within the wastewater collection tank, the wall of the enclosure having an interior surface and an exterior surface, a liquid-gas mixing device positioned within the chamber and configured to inject ozone into wastewater flowing through the liquid-gas mixing device, the liquid-gas mixing device having an inlet, an outlet and an ozone injection port positioned between the inlet and outlet, a contact volume positioned within the chamber and interconnected to the outlet of the liquid-gas mixing device, wherein the contact volume comprises an elongate length of contact piping extending one or more turns about a perimeter of the chamber along the interior surface of the wall, wherein the contact volume includes a turbulence imparting interior surface to impart turbulence to a mixture of wastewater and ozone gas as the mixture of wastewater and ozone gas flows through the contact volume, a static mixing chamber coupled to the contact volume and positioned within the chamber, the static mixing chamber configured to impart turbulence to the mixture of wastewater and ozone gas as the mixture of wastewater and ozone gas flows through the static mixing chamber, and a pump positioned within the chamber and interconnected to the liquid-gas mixing device, when the enclosure is at least partially submerged in the volume of wastewater contained in the wastewater holding tank, the pump being configured to draw wastewater from the volume of wastewater within the chamber external to the liquid-gas mixing device, contact volume and static mixing chamber and entered through the plurality of openings in the wall, and pump the wastewater through liquid-gas mixing device, contact volume and static mixing chamber and back into the volume of wastewater.

* * * * *